Nov. 8, 1966       J. L. HUDSON       3,284,788

FLOW RATE MONITORING SYSTEMS

Filed Feb. 17, 1964       2 Sheets-Sheet 1

*INVENTOR.*
JAMES L. HUDSON
BY
ATTORNEY

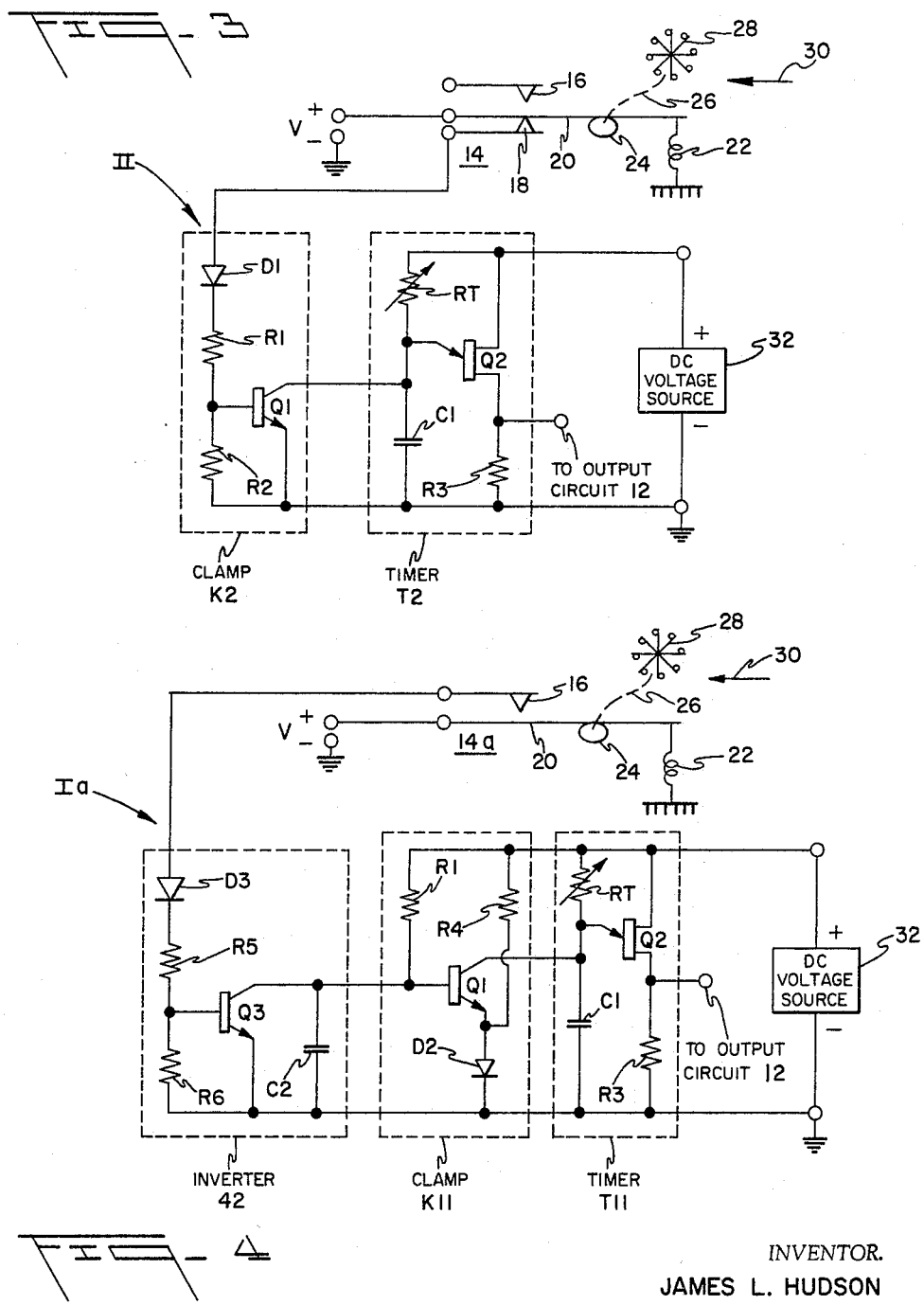

United States Patent Office 3,284,788
Patented Nov. 8, 1966

3,284,788
FLOW RATE MONITORING SYSTEMS
James L. Hudson, Cranford, N.J., assignor to Elastic Stop Nut Corporation of America, Union, N.J., a corporation of New Jersey
Filed Feb. 17, 1964, Ser. No. 345,461
6 Claims. (Cl. 340—239)

This invention relates generally to monitoring systems, and more particularly to novel systems for monitoring the rate of flow of a substance. The novel flow rate monitoring systems of the present invention are particularly useful, for example, for monitoring the rate of flow of a fluid in a pipeline.

In many manufacturing and chemical processes, it is necessary that a fluid, such as liquid or gas, be fed or consumed at a predetermined rate. If the rate of flow of the fluid should fall below a desired rate, it is important that a warning signal be produced so that the manufacturing process may be stopped and excessive waste prevented.

It is an object of the present invention to provide novel systems for monitoring the rate of flow of a substance and to provide an alarm when the rate of flow falls below a predetermined level.

Another object of the present invention is to provide novel monitoring systems of the type described that are relatively simple in circuitry, easy to manufacture and operate, and highly efficient in use.

Briefly stated, each of the novel flow rate monitoring systems of the present invention comprises a two-position switch and switch actuating means, such as a paddle wheel or propeller blade, disposed in the path of the substance whose rate of flow it is desired to monitor. The switch is actuated from one position to the other at a rate which is directly related to the rate of flow of the substance. In one embodiment of the invention, first and second circuits, each comprising a clamp circuit, a timer circuit, and output means are provided. The first and second circuits are connected to the switch in a manner whereby each is energized in a separate position, respectively, of the switch. In another embodiment of the present invention, a first circuit is connected directly to the two-position switch, and a second circuit is connected to the switch through an inverter circuit. In each of the first and second circuits a timer circuit is rendered inoperative when a clamp circuit is energized through the two-position switch. Under normal conditions, the rate of flow of the substance actuates the switch at a frequency whose period is less than the time it takes for either timer circuit to produce a signal. In the event that the rate of flow falls below a predetermined level, the two-position switch is operated between one position and the other for periods of time which are greater than the time delays of either timer, and a signal is applied to the output means to provide an alarm.

The novel features of the present invention, both as to its organization and method of operation, as well as the additional objects and advantages thereof, will be more fully understood from the following description, when read in connection with the accompanying drawings, in which similar parts are designated by similar reference characters, and in which:

FIGURE 3 is a schematic diagram of a portion of the circuitry indicated in block form in FIGURE 1; and FIGURE 4 is a schematic diagram of a portion of the circuitry indicated in block form in FIGURE 2.

Figure 1:
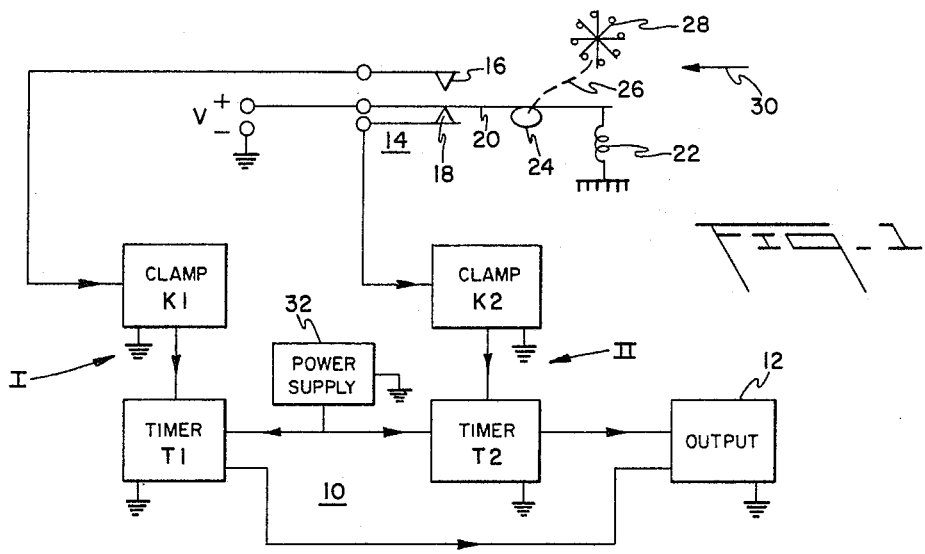
FIGURE 1 is a schematic diagram, in block form, of one embodiment of the flow rate monitoring system of the present invention.

Referring now particularly to FIGURE 1 of the drawing, there is shown a flow rate monitoring system 10 for providing a signal to output means 12, such as a warning light or horn, for example, when the rate of flow of a substance (not shown), such as a liquid, a gas, or even a powdered substance, falls below a predetermined rate. The system 10 comprises a two-position switch 14, such as a single pole-double throw switch. The switch 14 comprises a pair of fixed contacts 16 and 18 and a movable contact 20. The movable contact 20 is biased into electrical engagement with the fixed contact 18 by means of a spring 22. The movable contact 20 may be moved away from the fixed contact 18 and into electrical engagement with the fixed contact 16 by means of an eccentric cam 24. The cam 24 is fixed to a shaft 26 for rotation therewith when rotatable means 28, such as a paddle wheel or a propeller blade, for example, also fixed to the shaft 26, is rotated by the flow of a fluid substance. The direction of flow of the fluid substance is indicated by the arrow 30. It will now be understood that the flow of a fluid substance in the direction of the arrow 30 causes the rotatable means 28 to rotate the shaft 26 which, in turn, rotates the eccentric cam 24 and causes the movable contact 20 to engage the fixed contact 16 and 18 alternately at a frequency whose period is a function of the rate of flow of the fluid substance.

A source of voltage V has its positive terminal connected to the movable contact 20 for the purpose hereinafter appearing. The negative terminal of the voltage source is connected to a common connection, herein indicated as ground. The source of voltage V may be either A.C. or D.C. If it is A.C., then diodes D1 and D3 are necessary to prevent damage to the base-emitter junction of transistors Q1 and Q3 during the negative half-cycles. If the source of voltage V is D.C., then the diodes D1 and D3 are not required.

The system 10 comprises two substantially similar circuits I and II, each energized through a separate one of the fixed contacts 16 and 18, respectively, of the switch 14. The circuit I, energized through fixed contact 16, comprises a clamp circuit K1, a timer circuit T1 and the output means 12. The circuit II, energized through the fixed contact 18, comprises a clamp circuit K2, a timer circuit T2, and the output means 12. The timer circuits T1 and T2 are energized by a power supply 32 which may also be the source of voltage V. The clamp circuits K1 and K2, timer circuits T1 and T2, the output means 12, and the power supply 32 all have a common input and output terminal that is connected to the common connection, ground. The input of the clamp circuit K1 is connected to the fixed terminal 16, and the output of the clamp circuit K1 is connected to the input of the timer circuit T1. The output of the timer circuit T1 is connected to the input of the output means 12. The input of the clamp circuit K2 is connected to the fixed contact 18, and the output of the clamp circuit K2 is connected to the input of the timer circuit T2. The output of the timer circuit T2 is also connected to the input of the output means 12.

Referring now to FIGURE 3, the circuitry of the clamp circuit K2 and the timer circuit T2 of the circuit II is shown. The circuitry of the clamp circuit K1 and the timer circuit T1 of circuit I is substantially similar to that of the clamp circuit K2 and the timer circuit T2 of the circuit II, respectively. The clamp circuit K2 comprises an NPN transistor Q1 whose emitter is connected directly to ground and whose base is connected to ground through a bias resistor R2. The anode of a diode D1 is connected to the fixed contact 18 of the switch 14, and the cathode of the diode D1 is connected to the base of the transistor Q1 through a resistor R1. The collector of the transistor Q1 is connected to the junction of the emitter of a unijunction transistor Q2 and one end of a capacitor C1 in the timer circuit T2. The other end of the capacitor C1 is grounded. The positive terminal of the voltage source 32 is connected to the emitter of the unijunction transistor Q2 through a resistor RT. The positive terminal of the voltage source 32 is also connected to one of the bases of the unijunction transistor Q2. The other base of the unijunction transistor Q2 is connected to ground through a load resistor R3. R3 may be located in either base of the unijunction transistor Q2. Output signals developed across the resistor R3 are applied to the input of the output means 12. The circuitry including the unijunction transistor Q2, the resistor RT, the capacitor C1, and the resistor R3 comprises the timer circuit T2.

When the clamp circuit K2, in FIGURE 3, is energized as when the movable contact 20 is in electrical engagement with the fixed contact 18, current from the voltage source V provides a bias voltage across the resistor R2 that renders the transistor Q1 conductive. Under these conditions, current from the voltage source 32 flows through the resistor RT and the collector-emitter path of the transistor Q1. Because of the relatively low collector-emitter voltage developed by the conducting transistor Q1, the voltage across the capacitor C1 is not sufficient to cause the unijunction transistor Q2 to conduct. Consequently, the unijunction transistor Q2 is clamped de-energized and no signal is produced across the resistor R3.

Let it now be assumed that the movable contact 20 is moved into electrical engagement with the fixed contact 16, and the clamp circuit K2 is not energized through the voltage source V. Current from the voltage source 32 can now flow through the resistor RT and charge the capacitor C1, the transitsor Q1 now being non-conductive. After a period of time determined by the RC constant of the resistor RT and the capacitor C1, the capacitor C1 charges to a voltage sufficient to render the unijunction transistor Q2 conductive, and current flows through the resistor R3, producing a signal thereacross. This signal is applied to the output means 12 which may produce an alarm signal in the form of a sound, light, or any other suitable result, such as actuating a switch to interrupt a process.

As long as the rate of flow of the fluid substance being monitored by the system 10 causes the two-position switch 14 to be actuated from one position to the other at periods of time which are less than the time it takes for the capacitors C, to charge and fire the unijunction transistor Q2, in each timer circuit, no signal will be applied to the output means 12. When the rate of flow of the fluid falls below a predetermined level, the two-position switch 14 will be operated between one position and the other for periods of time which are greater than the time necessary to charge capacitors C1 in each timer. Under the latter circumstances, the unijunction transistor Q2 fires, that is, becomes conductive and provides a signal across the resistor R3 which, in turn, is applied to the output circuit 12 to produce an alarm.

Figure 2:
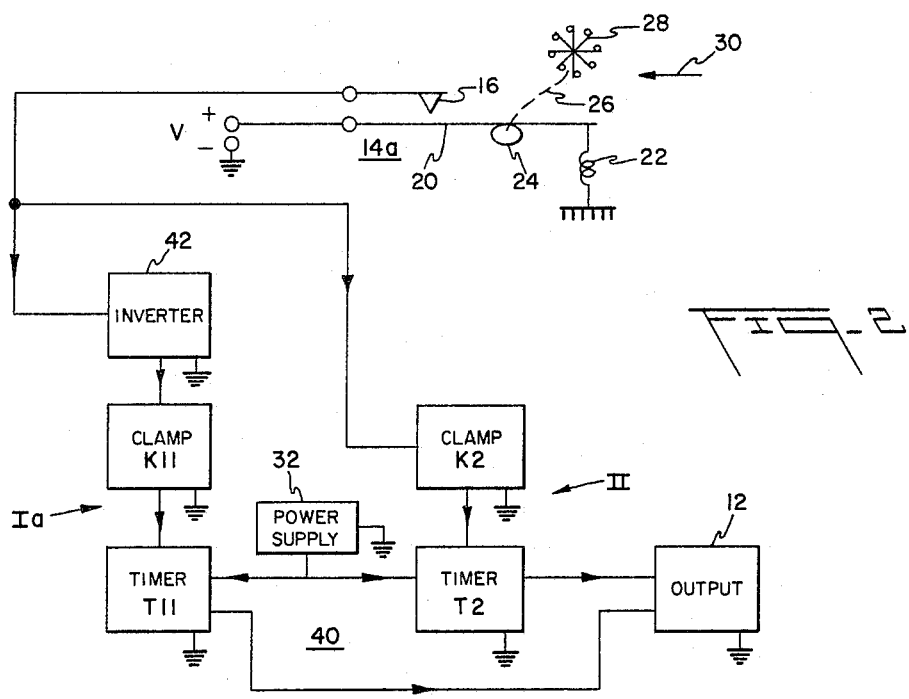
FIGURE 2 is a schematic diagram, in block form, of another embodiment of the flow rate monitoring system of the present invention.

Referring now to FIGURE 2 of the drawing, there is shown another embodiment 40 of the flow rate monitoring system of the present invention employing a two-position switch 14a which has one fixed contact 16 and a movable contact 20. The movable contact 20 in the system 40 is biased to its open position by the spring 22. The cam 24, cooperating with the movable contact 20, is adapted to move the movable contact 20 into and out of electrical engagement with the fixed contact 16 at a frequency determined by the rate of flow of the fluid substance to be monitored. The circuit II, in FIGURE 2, comprising the clamp circuit K2, the timer circuit T2 and the output means 12, is connected in the manner described for circuit II in FIGURES 1 and 3. The circuit Ia, in FIGURE 2 is connected in series with the fixed contact 16. An inverter circuit 42 has its input connected to the fixed contact 16 also and its output connected to the input of a clamp circuit K11. The output of the clamp circuit K11 is connected to the input of a timer circuit T11, and the output of the timer circuit T11 is connected to the input of the output means 12. The inverter circuit 42, the clamp circuit K11, and the timer circuit T11 each have a common input and output terminal connected to the common connection, ground.

A source of voltage V, which may be A.C. or D.C., is connected to the movable contact 20, and the power supply 32 is connected to timers T11 and T2 to energized them when not clamped by the clamp circuit K11 and K2, respectively. The operation of the circuit II, comprising the clamp circuit K2, the timer circuit T2 and the output means 12, is the same as described for the similar circuit II in FIGURES 1 and 3.

Referring now to the schematic diagram of FIGURE 4, the components of the inverter circuit 42, the clamp circuit K11, and the timer circuit T11, all comprising circuit Ia, are shown. The inverter circuit 42 comprises an NPN transistor Q3, whose emitter is connected to the negative terminal of the voltage source 32, the latter being grounded. The collector of the transistor Q3 is also connected to ground through a capacitor C2. If the voltage source V is alternating current, the capacitor C2 should have a value such that the voltage developed across it will be insufficient to cause conduction through the transistor Q1 during the negative half-cycles of the A.C. voltage. A transistor Q3 is biased by a resistor R6 connected between its base and its emitter. The anode of a diode D3 is connected to the fixed contact 16, and the cathode of the diode D3 is connected to the base of the transistor Q3 through a resistor R5.

The clamp circuit K11 comprises an NPN resistor Q1 whose emitter is connected to the common connection through a diode D2. The anode of the diode D2 is connected to the positive terminal of the voltage source 32 through a resistor R4. The diode D2 functions to insure that no current will flow into the base of the transistor Q1 when the transistor Q3 is conducting. The base of the transistor Q1 is connected to the positive terminal of the voltage source 32 through the resistor R1. The collector of the transistor Q1 is connected to the emitter of a unijunction transistor Q2 in the timer circuit T11. The collector of the transistor Q3 of the inverter circuit 42 is connected to the base of the transistor Q1 in the clamp circuit K11.

The emitter of the unijunction transistor Q2 is connected to the positive terminal of the voltage source 32 through the resistor RT. The emitter of the unijunction transistor Q2 is also connected to the common connection through the capacitor C1. One of the bases of the unijunction transistor Q2 is connected to the positive terminal of the voltage source 32, and the other of the bases of the unijunction transistor Q2 is connected to the negative terminal of the voltage source 32 through the load resistor R3. When current flows through the unijunction transistor Q2 of the timer circuit T11, the voltage developed across the resistor R3 provides a signal that is applied to the output means 12.

The operation of the flow rate monitoring system 40, illustrated in FIGURE 2 and, in part, in FIGURE 4, will now be explained: When the switch 14a is open, as shown in FIGURES 2 and 4, the transistor Q3 in the inverter circuit 42 is not conducting. Current can now flow from the voltage source 32, through Q1 in the clamp circuit K11. Current also flows through the collector-emitter path of the transistor Q1, providing a relatively low voltage across the capacitor C1 in the timer circuit T11 that is insufficient to render the unijunction resistor Q2 conductive. Consequently, no signal is developed across the resistor R3 in the timer circuit T11, the latter being clamped.

When the switch 14a is open, as shown in FIGURES 2 and 4, the transistor Q1 in circuit II is also not conducting, as explained for the circuit II in FIGURES 1 and 3, and the unijunction transistor Q2 in the timer circuit T2 can become conducting and produce an output signal across the resistor R3, provided that the rate of flow of the fluid substance being monitored is below a predetermined level so that the capacitor C1 has time to charge sufficiently to render the unijunction transistor Q2 conductive.

Referring again to FIGURES 2 and 4, let it be assumed that the movable contact 20 is touching the fixed contact 16 of the switch 14a. Current from the voltage source V now provides sufficient bias for the transistor Q3 of the inverter circuit 42 to render it conductive. Under these circumstances, the transistor Q1 in the clamp K11 is rendered non-conductive, and the capacitor C1 can be charged. The unijunction transistor Q2 will be rendered conductive if the contact 20 is touching contact 16 for a period of time longer than is necessary to charge the capacitor C1 to a voltage that will render the unijunction transistor Q2 conductive. Under the latter circumstances, a signal produced across the resistor R3 is applied to the output means 12 to render an alarm.

The resistor RT in the timer circuits T1 and T2 and T11 may be adjustable so that the charging rate of the capacitor C1 may be adjusted to any desired value.

From the foregoing description, it will be apparent that there has been provided flow rate monitoring systems for monitoring the rate of flow of a fluid substance and for providing an alarm if the rate of flow falls below a predetermined level or stops. While only two examples of the flow rate monitoring systems have been described, variations in their circuitry and applications, all coming within the spirit of this invention, will, no doubt, readily suggest themselves to those skilled in the art. Hence, it is desired that the foregoing shall be considered as illustrative and not in a limiting sense.

The embodiments of this invention in which a particular property or privilege is claimed are defined as follows:

1. A system for monitoring the rate of flow of a substance, said system comprising:
    (a) first and second circuits, each of said first and second circuits comprising first and second clamp circuits and first and second timer circuits, respectively,
    (b) a two-position switch having a movable contact,
    (c) means to apply a source of voltage to said movable contact,
    (d) means cooperatively engaged with said movable contact to actuate said switch from one of two positions to the other of said two positions at a frequency whose period is a function of the rate of flow of said substance,
    (e) means connecting said first circuit to said switch to energize said first clamp circuit when said switch is in one of said two positions thereof,
    (f) means connecting said second circuit to said switch to energize said second clamp circuit when said switch is in the other of said two positions thereof,
    (g) means including a source of voltage to energize said first or said second timer circuit when said first or said second clamp circuit, respectively, is de-energized,
    (h) said first and said second timer circuits comprising means to produce an output signal when energized for a predetermined period of time, and
    (i) means connecting said first and said second timer circuits to said output means to apply said output signal thereto.

2. A system for monitoring the rate of flow of a substance, said system comprising:
    (a) first and second circuits, each of said first and second circuits comprising first and second clamp circuits and first and second timer circuits, respectively,
    (b) a two-position switch having a movable contact,
    (c) means to apply a source of voltage to said movable contact of said switch,
    (d) means cooperatively engaged with said movable contact to actuate said switch from one of two positions to the other of said two positions at a frequency whose period is a function of the rate of flow of said substance,
    (e) means connecting said first and second circuits to said switch to energize said first and second clamp circuits alternately when said switch is first in said one and then in said other of said positions, respectively,
    (f) means connected to said first and said second timer circuits to energize them when said first and second clamp circuits, respectively, are de-energized,
    (g) output means, and
    (h) means connecting said first and said second timer circuits to said output means, said first and second timer circuits comprising means to apply a signal to said output means when any one of said timer circuits has been energized for a predetermined period of time.

3. A system for monitoring the rate of flow of a substance, said system comprising:
    (a) a two-position switch having a pair of fixed contacts and a movable contact,
    (b) means cooperatively engaged with said movable contact to move said movable contact periodically between said pair of fixed contacts at a frequency whose period is a function of the rate of flow of said substance,
    (c) first and second clamp circuits,
    (d) first and second timer circuits,
    (e) output means,
    (f) a source of voltage connected to said movable contact,
    (g) means connecting one of said fixed contacts, said first clamp, said first timer, and said output means in a first circuit to energize said first clamp circuit and to de-energize said first timer circuit when said movable contact is in engagement with said one of said fixed contacts,
    (h) means connecting the other of said fixed contacts, said second clamp circuit, said second timer circuit and said output means in a second circuit to energize said second clamp circuit and to de-energize said second timer circuit when said movable contact is in engagement with said other of said fixed contacts, and
    (i) said first and said second timer circuits comprising means to provide an output signal to said output means after being energized for a predetermined period of time.

4. A system for monitoring the rate of flow of a substance, said system comprising:
    (a) a two-position switch having a pair of fixed contacts and a movable contact,
    (b) means cooperatively engaged with said movable contact to move said movable contact periodically between said pair of fixed contacts at a frequency whose period is a function of the rate of flow of said substance,
    (c) first and second clamp circuits,
    (d) first and second timer circuits,
    (e) output means,
    (f) a source of voltage,
    (g) means to connect said source of voltage to said movable contact,
    (h) means connecting one of said fixed contacts, said first clamp circuit, said first timer circuit, and said output means in a first circuit to energize said first clamp circuit and to de-energize said first timer circuit only when said movable contact is in engagement said one of said fixed contacts, (i) means connecting the other of said fixed contacts, said second clamp circuit, said second timer circuit and said output means in a second circuit to energize said second clamp circuit and to de-energize said second timer circuit only when said movable contact is in engagement with said other of said fixed contacts, (j) each of said first and second timer circuits comprising a transistor circuit and means to render said transistor conductive when its respective timer circuit has been energized for a predetermined period, (k) a load resistor in each of said transistor circuits for developing a signal thereacross when said transistor becomes conductive, and (l) means to apply said signal to said output means to produce a warning signal.

5. A system for monitoring the rate of flow of a substance, said system comprising:

(a) a two-position switch having a movable contact and a fixed contact, (b) first voltage means connected to said movable contact, (c) means cooperatively engaged with said movable contact to open and close said switch periodically at a frequency whose period is a function of the rate of flow of said substance, (d) a first circuit comprising an inverter circuit, a first clamp circuit, a first timer circuit, and output means, (e) means connecting said first circuit to said fixed contact to energize said inverter circuit when said switch is closed, (f) said inverter circuit being connected to said first clamp circuit to de-energize said first clamp circuit when said inverter circuit is energized, (g) second voltage means connected to said first clamp circuit and to said first timer circuit to energize said first timer circuit when said inverter circuit de-energizes said first clamp circuit, (h) said first timer circuit comprising means to produce an output signal to said output means when said timer circuit is energized for a predetermined period of time, (i) a second circuit comprising a second clamp circuit, a second timer circuit, and said output means, (j) means connecting said second circuit to said fixed contact, (k) said second clamp circuit being energized from said first voltage means when said switch is closed, (l) said second voltage means being connected to said second timer circuit to energize said second timer circuit and to produce an output signal to said output means after said predetermined period of time, and (m) said second clamp circuit being connected to said second timer circuit to prevent said second timer circuit from being energized when said second clamp circuit is energized by said first voltage means.

6. A system for monitoring the rate of flow of a substance, said system comprising:

(a) a two-position switch having a movable contact and a fixed contact, (b) means to apply a first source of voltage to said movable contact, (c) means cooperatively engaged with said movable contact to open and close said switch periodically at a frequency whose period is a function of the rate of flow of said substance, (d) a first circuit comprising an inverter circuit, a first clamp circuit, a first timer circuit, and output means, (e) means to connect a second source of voltage to said first clamp circuit and to said first timer circuit, (f) means connecting said first circuit to said fixed contact to energize said inverter circuit from said first voltage source when said switch is closed, (g) said inverter circuit being connected to said first clamp circuit to de-energize said first clamp circuit when said inverter circuit is energized, and vice versa, (h) said first clamp circuit being connected to said first timer circuit to de-energize said first timer circuit when said inverter circuit is de-energized and said first clamp circuit is energized, and vice versa, (i) said first timer circuit comprising means to apply an output signal to said output means when said first timer circuit has been energized for a predetermined period of time, (j) a second circuit comprising a second clamp circuit, a second timer circuit and said output means, (k) means connecting said second voltage source to said second timer circuit, (l) means connecting said second clamp circuit to said fixed contact to be energized from said first voltage source when said switch is closed, (m) said second clamp circuit being connected to said second timer circuit to prevent said second timer circuit from being energized when said second clamp circuit is energized by said first voltage source, (n) said second source of voltage being connected to said second timer circuit to energize said second timer circuit and to produce an output signal when said second clamp circuit is de-energized for a predetermined period of time, and (o) said second timer circuit being connected to said output means to apply its output signal thereto.

References Cited by the Examiner

UNITED STATES PATENTS

| | | | |
|---|---|---|---|
| 2,472,526 | 6/1949 | Frazee | 340—271 X |
| 2,845,548 | 7/1958 | Sillman et al. | 317—148.55 |
| 2,970,228 | 1/1961 | White et al. | 317—148.55 |
| 2,972,678 | 2/1961 | Anton | 340—259 X |

FOREIGN PATENTS 788,313    12/1957    Great Britain.

NEIL C. READ, *Primary Examiner.*

D. MYER, *Assistant Examiner.*